E. MOSHER.

Sap-Spout.

No 26,858.          Patented Jan. 17, 1860

Witnesses:
Alanson Niles
O. Clarke

Inventor:
Eli Mosher

UNITED STATES PATENT OFFICE.

ELI MOSHER, OF FLUSHING, MICHIGAN.

IMPROVEMENT IN SAP-CONDUCTORS.

Specification forming part of Letters Patent No. 26,858, dated January 17, 1860.

*To all whom it may concern:*

Be it known that I, ELI MOSHER, of Flushing, in the county of Genesee and State of Michigan, have invented a new and Improved Sap-Conductor; and I do hereby declare that the following is a full, clear, and exact description of the same, reference being had to the accompanying drawings, forming a part of this specification, in which—

Figure 1:
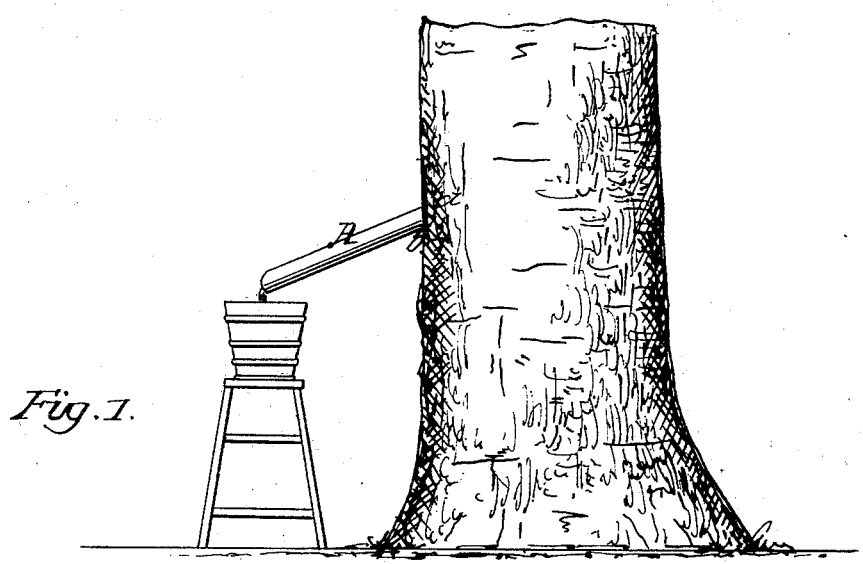
Figure 2:
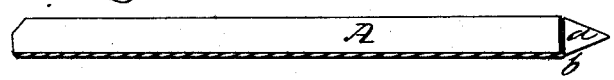
Figure 3:
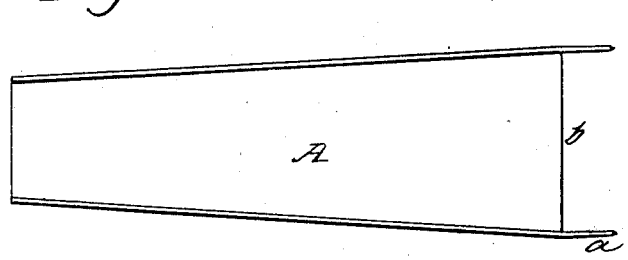

Figure 1 represents my conductor as applied to a tree. Fig. 2 is a longitudinal vertical section of my invention. Fig. 3 is a plan or top view of the same.

Similar letters of reference in the three views indicate corresponding parts.

In order to gain the sap of maple or other trees the usual mode of operation is to drill holes into the trees or to make incisions into them, and to conduct the sap which flows from the same by means of suitable spouts or conductors to buckets, which serve to carry the sap to the desired place. Such spouts or conductors have to be fastened to the trees so as to sustain themselves, and in such a manner that a tight joint is made between the inner edge of the conductor and the tree, so that all the sap running down from the hole in the tree is compelled to pass into the conductor. At the same time, when the conductor is secured to the tree care must be taken to do this in such a manner that no hole is made into the tree which would cause a leak. My conductors are so arranged by means of prongs or barbs of a particular form, and by making the inner edge between said prongs sharp, that the same can be driven into a tree at any place, so as to make a perfectly-tight joint and without danger of causing a leak.

To enable those skilled in the art to make and use my invention, I will proceed to describe it.

My conductors A are made of thin but hard sheet metal, bent up at the edges or rounded, if desired, so as to confine the sap and to form a perfect spout. The inner edge of my conductors is furnished with two or more prongs or barbs, $a$, of triangular form, as clearly shown in Fig. 2, and long enough to enter through the bark of the tree into the wood.

The inner edge, $b$, of my conductors is sharpened, so that when the prongs are driven into a tree said edge cuts into the bark and makes a perfectly-tight joint with the surface of the tree.

It will be noticed that the prongs $a$ are very thin, but wide enough edgewise to support the weight of the conductor. When driven into a tree they (the prongs) open but a very narrow crevice, which causes no leak, and which closes up again as soon as the conductor is removed.

Simple as these conductors may appear they are of great advantage, as the same can readily be attached to any tree and whenever desired, and as they conduct all the sap flowing from the hole in the tree to the bucket not a particle being allowed to run down on the stem; and at the same time, by the use of my conductors, the trees are saved and no leak is created, whereby some of the sap would be lost.

Having thus described my invention, I claim and desire to secure by Letters Patent—

As an improved article of manufacture, a sap-conductor provided with the sharp edge $b$ and side prongs, $a\ a$, as herein shown and described.

ELI MOSHER.

Witnesses:
O. C. BURKE,
ALANSON NILES.